US011246306B2

(12) United States Patent
Dillon

(10) Patent No.: US 11,246,306 B2
(45) Date of Patent: Feb. 15, 2022

(54) INSECT ERADICATION DEVICE

(71) Applicant: Saltshot, LLC, Aspen, CO (US)

(72) Inventor: Christopher Dillon, Glenwood Springs, CO (US)

(73) Assignee: Saltshot, LLC, Aspen, CO (US)

( * ) Notice: Subject to any disclaimer, the term of this patent is extended or adjusted under 35 U.S.C. 154(b) by 0 days.

(21) Appl. No.: 16/548,618

(22) Filed: Aug. 22, 2019

(65) Prior Publication Data

US 2020/0060255 A1  Feb. 27, 2020

Related U.S. Application Data

(60) Provisional application No. 62/721,406, filed on Aug. 22, 2018, provisional application No. 62/769,734, filed on Nov. 20, 2018.

(51) Int. Cl.
*A01M 27/00* (2006.01)
*F41B 3/02* (2006.01)

(52) U.S. Cl.
CPC .............. *A01M 27/00* (2013.01); *F41B 3/02* (2013.01); *A01M 2200/012* (2013.01)

(58) Field of Classification Search
CPC .......... A01M 27/00; A01M 3/00; A01M 9/00; A01M 2200/01; A01M 2200/012; A01K 97/02; A47J 42/14; A47J 42/34; F41B 3/02; F41B 3/00
USPC ........ 43/132.1, 124, 1, 44.99; 241/168, 169, 241/169.1, 198.1, 220, 301; 124/20.1, 56
See application file for complete search history.

(56) References Cited

U.S. PATENT DOCUMENTS 1,611,533 A * 12/1926 Kirsten ................. F41B 9/0037
222/79
2,757,658 A * 8/1956 Harris ....................... F41B 3/00
124/17
2,996,060 A * 8/1961 Appleby .................... F41B 3/02
124/41.1

(Continued)

FOREIGN PATENT DOCUMENTS

CN  204147924 U  2/2015
CN  204666037 U  9/2015

(Continued)

OTHER PUBLICATIONS https://youtu.be/x354j-DZFWY Jul. 19, 2008.

(Continued)

*Primary Examiner* — Darren W Ark
*Assistant Examiner* — Kevin M Dennis
(74) *Attorney, Agent, or Firm* — D'Ambrosio & Menon, PLLC; Usha Menon

(57) ABSTRACT

An insect eradication device configured to fit within the palm of the user's hand. The device includes a body defining at least a pair of radial compartments. The compartments can be arranged substantially adjacent to each other. The compartments can be substantially circular or elliptical in shape. A first compartment is configured to securably receive a balloon propulsion sling pouch. A second compartment includes a combination projectile container and grinder. The projectile can include salt or another suitable substance. The device uses salt—which is not a food or debris that bugs would consume—to kill flies and other bugs.

10 Claims, 14 Drawing Sheets

(56) References Cited

U.S. PATENT DOCUMENTS

| | | | |
|---|---|---|---|
| 3,556,071 A * | 1/1971 | Udesen | F41B 3/02 124/16 |
| 4,026,336 A * | 5/1977 | Spies | B65B 39/004 141/348 |
| 4,125,106 A * | 11/1978 | Kelly | F41B 3/02 124/17 |
| 4,132,027 A * | 1/1979 | Malacheski | A01M 3/00 43/110 |
| 7,422,170 B2 | 9/2008 | Bao | |
| 7,464,701 B1 * | 12/2008 | Mendoza | F41B 7/08 124/20.1 |
| 7,648,093 B2 * | 1/2010 | Kruger | A61J 7/0007 241/169 |
| 7,861,698 B2 * | 1/2011 | Nordstog | F42B 12/36 124/16 |
| 8,083,167 B1 | 12/2011 | Namakian | |
| 8,196,571 B2 * | 6/2012 | Jenson | F41A 21/48 124/73 |
| 8,393,563 B2 | 3/2013 | Chaoui | |
| 8,695,906 B2 | 4/2014 | Hainbach | |
| 8,925,535 B2 * | 1/2015 | Phillips | F41B 3/02 124/20.1 |
| 9,198,541 B2 | 12/2015 | Smith | |
| 9,241,597 B2 | 1/2016 | Dukat | |
| 9,255,752 B2 * | 2/2016 | Phillips | F41B 7/08 |
| 9,392,908 B2 | 7/2016 | Edwards | |
| 9,494,455 B1 * | 11/2016 | Gora | G01F 11/282 |
| 9,510,709 B2 | 12/2016 | Wilson | |
| 9,521,929 B1 | 12/2016 | Raphael | |
| 9,635,884 B2 * | 5/2017 | Shalom | A47J 42/34 |
| 10,039,418 B2 | 8/2018 | Staiano | |
| 10,194,688 B2 * | 2/2019 | Roberto, Jr. | A61J 7/0076 |
| 2008/0035134 A1 * | 2/2008 | Nordstog | F42B 12/36 124/16 |
| 2008/0053421 A1 * | 3/2008 | Chang | F41B 3/02 124/45 |
| 2010/0288255 A1 * | 11/2010 | Jenson | F41B 11/62 124/56 |
| 2012/0311921 A1 * | 12/2012 | Ogilvie | A01M 3/00 43/132.1 |
| 2014/0158103 A1 * | 6/2014 | Phillips | F41B 3/02 124/17 |
| 2015/0083097 A1 * | 3/2015 | Phillips | F41B 3/02 124/20.1 |
| 2016/0106262 A1 | 4/2016 | Mroue | |
| 2016/0143480 A1 | 5/2016 | Watts | |
| 2017/0245541 A1 * | 8/2017 | Pagan | A47J 42/34 |
| 2017/0319009 A1 | 11/2017 | Seckel | |
| 2017/0332697 A1 * | 11/2017 | Roberto, Jr. | A24B 7/06 |
| 2018/0064092 A1 | 3/2018 | Maggiore | |
| 2020/0061629 A1 * | 2/2020 | Breneman | B02C 18/08 |

FOREIGN PATENT DOCUMENTS

| | | |
|---|---|---|
| CN | 105135939 A | 12/2015 |
| CN | 106288945 B | 1/2017 |
| CN | 106440932 A | 2/2017 |
| CN | 106440933 A | 2/2017 |
| CN | 206037833 U | 3/2017 |
| CN | 206056392 U | 3/2017 |
| CN | 106979721 A | 7/2017 |
| CN | 206563531 U | 10/2017 |
| CN | 108106491 A | 6/2018 |
| DE | 102015007617 A1 | 12/2016 |

OTHER PUBLICATIONS https://youtu.be/j-Q_cFCRLk Nov. 24, 2010.
https://youtu.be/qZTIFVImKOc Jul. 9, 2009.
https://youtu.be/uT1RAymdDBk Dec. 5, 2008.
https://youtu.be/X2CQAJ5jg4k Feb. 24, 2010.
https://youtu.be/YVkcB8pNCQE Nov. 30, 2009.
https://youtu.be/Mg0vktghaDU Apr. 6, 2010.
https://youtu.be/9s7o0j0xrUY Nov. 1, 2010.
https://youtu.be/VPBsUKAAL0Q Oct. 7, 2010.
https://youtu.be/qlA8dJVISjQ Mar. 4, 2009.
https://youtu.be/yLkacmzRSG0 Jul. 2012.
The Pocket Shot Canada, Sep. 21, 2015.

* cited by examiner

INSECT ERADICATION DEVICE

CROSS REFERENCE TO RELATED APPLICATION

This application claims the benefit of Provisional U.S. Patent Application No. 62/721,406, filed Aug. 22, 2018, and entitled "INSECT ERADICATION DEVICE", and Provisional U.S. Patent Application No. 62/769,734, filed Nov. 20, 2018, and entitled "INSECT ERADICATION DEVICE", the entire content and disclosures of which, both express and implied, is incorporated herein by reference.

BACKGROUND

The invention relates to an insect eradication device and in particular, to an elastic powered insect eradication device.

Certain insects or bugs, such as, flies, are a nuisance to humans and can spread diseases to people and domestic animals by biting or carrying disease causing pathogens. Implements for swatting insects, such as, flyswatters require the user to chase down the fly and physically hit or smash the fly. This can create a situation where clean-up is required even if the fly is actually hit/caught and killed. Insecticides or bug sprays use potentially harmful chemicals. Fly traps and fly tapes can be unsightly. Bug zappers may require batteries or electricity for operation. Accordingly, there is an ongoing need for an insect eradication device which can kill bugs which is safe, environment friendly, convenient, portable and cost effective.

SUMMARY

The present invention is an insect eradication device ("device"). In an embodiment, the device is configured to exterminate winged insects, such as, mosquitoes and flies. Salt has conventionally been used to kill pests, such as slugs and snails, by absorbing fluids from their body and causing them to die of dehydration. The present device is configured to use salt as a projectile in order to kill insects/winged insects and bugs. The device has been configured to use salt or any other suitable material as a projectile. The terms projectile and salt are used interchangeably in this document. The term "projectile", as used in this document, includes common table salt, coarse salt, rock salt, or any other material/pellets such as BBs, airsoft BBs, rock salt and other similar material. The device is portable and is configured to fit into a purse or backpack, or in a user's pant/shirt/skirt/dress pocket.

According to an embodiment, an insect eradication device has a body having a front unit and a rear unit, wherein the front unit includes a first planar surface and a second planar surface abuts the first planar surface. The device includes a first compartment, wherein the first compartment is configured to receive a projectile. The first compartment is arranged along the first planar surface. The device further includes a second compartment, wherein the second compartment is radially opposite the first compartment, wherein the second compartment is configured to receive the projectile from the first compartment. The second compartment is arranged along the second planar surface. In an embodiment, the projectile comprises common table salt.

The first compartment includes a set of detachable grinders. A first grinder is positioned around a base of the first compartment. In one embodiment, the first compartment has a clear or transparent grinder lid. However, in another embodiment, the grinder lid can be made of any material, including a non-transparent material. A second grinder is arranged on an inner surface of the grinder lid. The grinder lid further comprises a rotatable handle arranged on an outer surface of the grinder lid. If the salt added to the first compartment is clumped up, for example, due to humidity, the handle of the grinder can be rotated to grind the salt before it is transferred to the second compartment.

The second compartment comprises a projectile conduit. The projectile conduit is configured to transfer the salt/projectile to a propulsion pouch. The projectile conduit also provides a constricted exit pathway for the salt expelled from the pouch. The pouch is reinforced with a plurality of vertical ribbed elements. The tip of the pouch can be reinforced to protect against wear and tear.

The device further includes a projectile dispensing regulator. The projectile dispensing regulator further comprises a sleeve and a dispenser. A thumbwheel can be coupled to the sleeve. The sleeve comprises a set of openings, wherein a first opening is configured to be aligned with an opening on the first compartment, and wherein a second opening is configured to be aligned with an opening on the second compartment. The set of openings is configured to be opened or closed by a rotation of the thumbwheel. The dispenser can include a spring-actuated push button at a first end. An optional salt drain can be coupled to the spring at an end opposite the push button. The device is a plastic device that is portable, light weight and configured to be held within the palm of the user's hand.

The device can include a rail or bracket. The rail or bracket is configured to receive at least one apparatus selected from a group consisting of a laser, a flash light, a pointer, an aiming apparatus, a camera, a phone and a LED light.

In another embodiment, an insect eradication kit includes the device of the present invention and one or more winged insect toys.

In another embodiment, a method of eradicating a winged insect involves providing the device of the present invention, inserting a desired amount of salt into a first compartment of the device, grinding the salt in the first compartment, transferring the ground salt to the second compartment, wherein the second compartment comprises a pouch for receiving the ground salt; and gripping a tip of the pouch and aiming the salt at the insect to be eradicated. The method further involves releasing the grip on the tip of the pouch. This causes the salt to be forcibly expelled toward the insect resulting in its demise.

DRAWINGS

DETAILED DESCRIPTION

The term and phrases "invention," "present invention," "instant invention," and similar terms and phrases as used herein are non-limiting and are not intended to limit the present subject matter to any single embodiment, but rather encompass all possible embodiments as described.

The device and methods of use can "comprise," "consist essentially of," or "consist of" any of the elements/features or steps disclosed throughout the specification. As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and can include the features and steps of the present invention and do not exclude other features or steps described herein. The use of the word "a" or "an" when used in conjunction with the term "comprising" in the claims and/or the specification may mean "one," but it is also consistent with the meaning of "one or more," "at least one," and "one or more than one." As used herein, "consisting essentially of" means that the invention may include features in addition to those recited in the claim, but only if the additional features do not materially alter the basic and novel characteristics of the claimed invention.

Figure 1A:
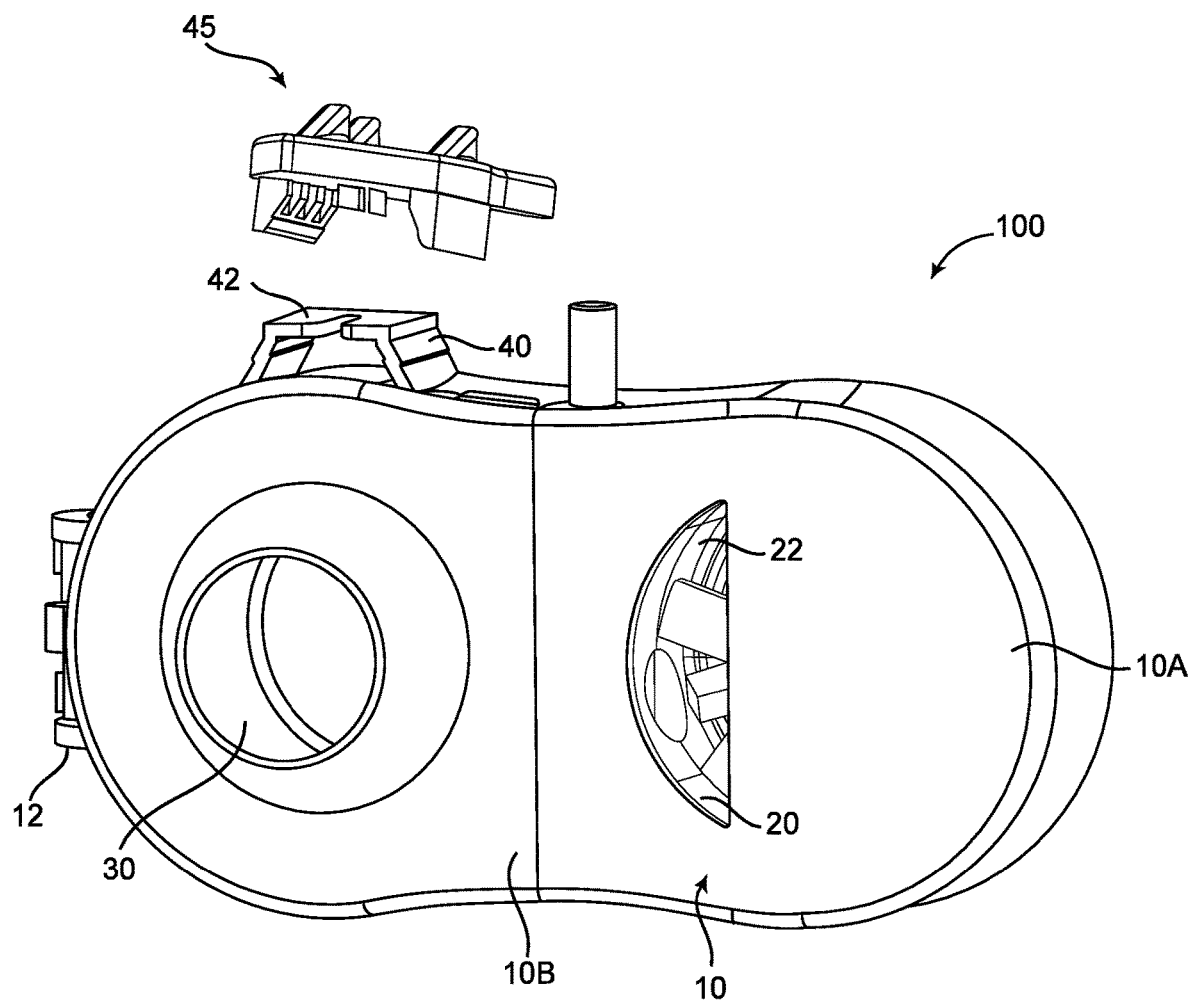
FIGS. 1A-1B illustrate front and rear views of the insect eradication device according to an embodiment.
Figure 1B:
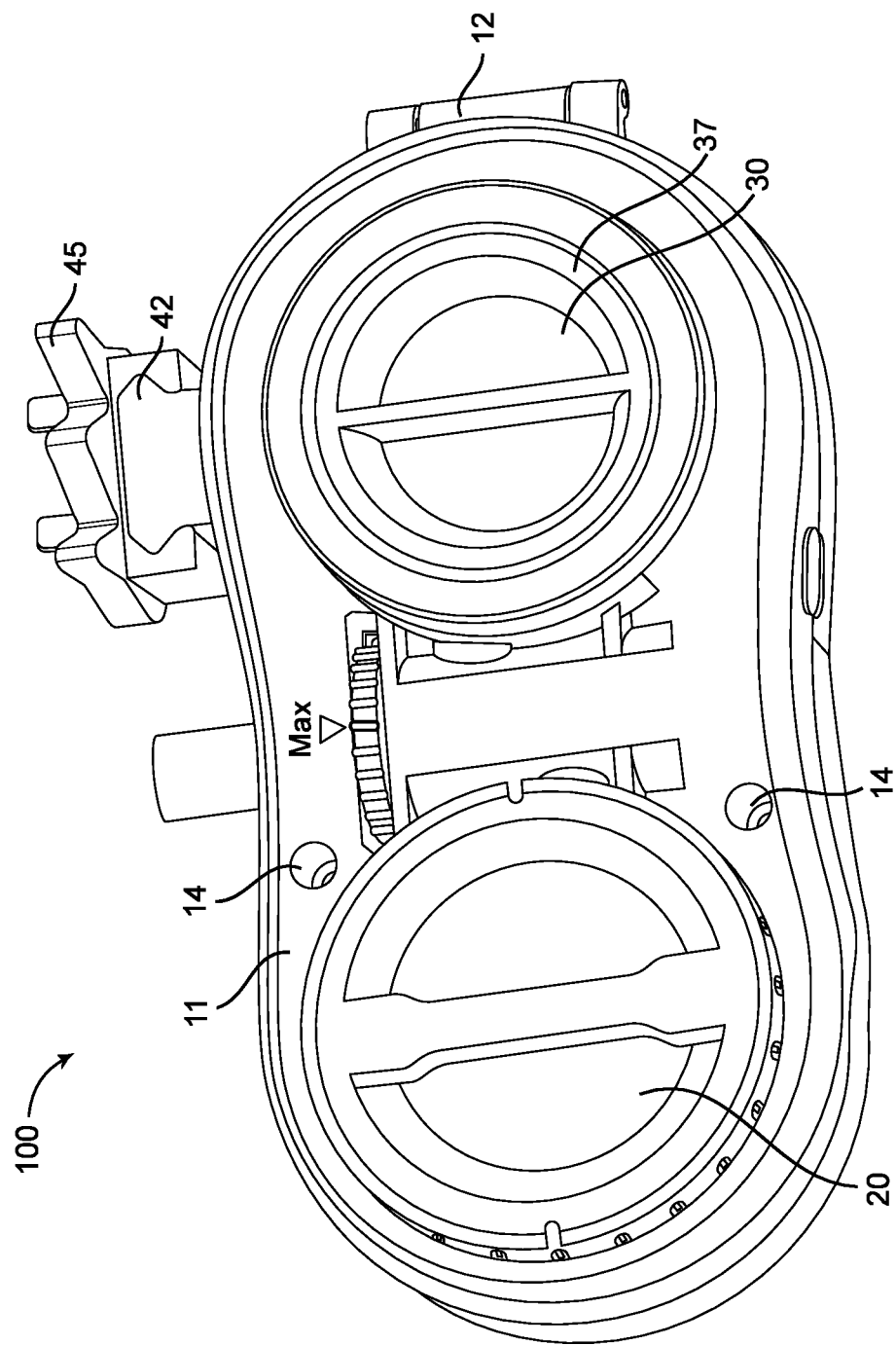

An exemplary insect eradication device is illustrated in FIGS. 1A and 1B. The device includes a device body 100 made of plastic or another suitable light-weight but durable material. The body 100 has a substantially case-shaped appearance. The body 100 includes a front unit 10 and a rear unit 11. The front unit 10 includes two sub-units, a first and a second planar bodies 10A, 10B abutting each other while the rear unit 11 includes a single planar body.

Planar body 10B is connected to the rear unit 11 by hinge 12 along a side of the body 100. The hinge 12 is configured to open and close easily by means of a conventional push-on mechanism. The device 100 can further include a suitable closure, such as, a tongue-and-groove mechanism opposite the hinged end to provide proper seal/closure. Conveniently, the hinge 12 allows the user to easily open and close planar body 10B which facilitates ease of service and replacement of parts (such as, a shooting pouch). The second planar body 10A can be connected to the rear unit 11 with fasteners, such as, screws 14. The device 100 be configured with rounded edges to allow a smooth feel in the user's hand.

The device 100 includes a pair of radially opposing compartments 20, 30 arranged substantially adjacent to each other. The compartments can be substantially circular or elliptical in shape. The device 100 includes a first "grinder" compartment 20. The grinder compartment 20 can be used to grind and/or store a projectile, such as, salt (not shown). The device 100 uses salt—which is not a food or debris that bugs would consume—to kill flies and other bugs. In an embodiment, a base of the grinder compartment can include a semi-transparent window 22. The semi-transparent window can be made of PVC. The semi-transparent window allows a user to gauge salt levels in the grinder and to view the grinder. The grinder compartment 20 can include an opening at the rear of the device. The opening can be covered with a grinder lid. The grinder compartment can further include a pair of grinders. The device 100 further includes a second "shooting" compartment 30. The shooting compartment 30 is configured to securely receive a balloon propulsion sling pouch ("pouch"). The pouch is configured for receiving and shooting the salt received from the grinder compartment 20. The shooting compartment 30 can include an opening along the front unit and the rear unit. A projectile conduit may be placed at the mouth of the front unit. The projectile conduit can be operably connected to the pouch.

The size and shape of each of the compartments may be varied without affecting the functionality of the device. In an embodiment, the hinge 12 is placed on the side of the device which holds the pouch (opposite side of grinder compartment). This allows the planar body 10B to be opened up like a book.

The device further includes a bracket/universal rail 40. The rail includes a groove 42. In certain embodiments, common/conventional devices such as, lasers, LED, camera, phones or flash lights (not shown) and any other device, such as, an aiming/pointing attachment or accessory can be fitted within the groove 42 of the rail 40. For instance, an optional pointer 45 can be tethered or attached tightly to the rail 40.

Figure 2A:
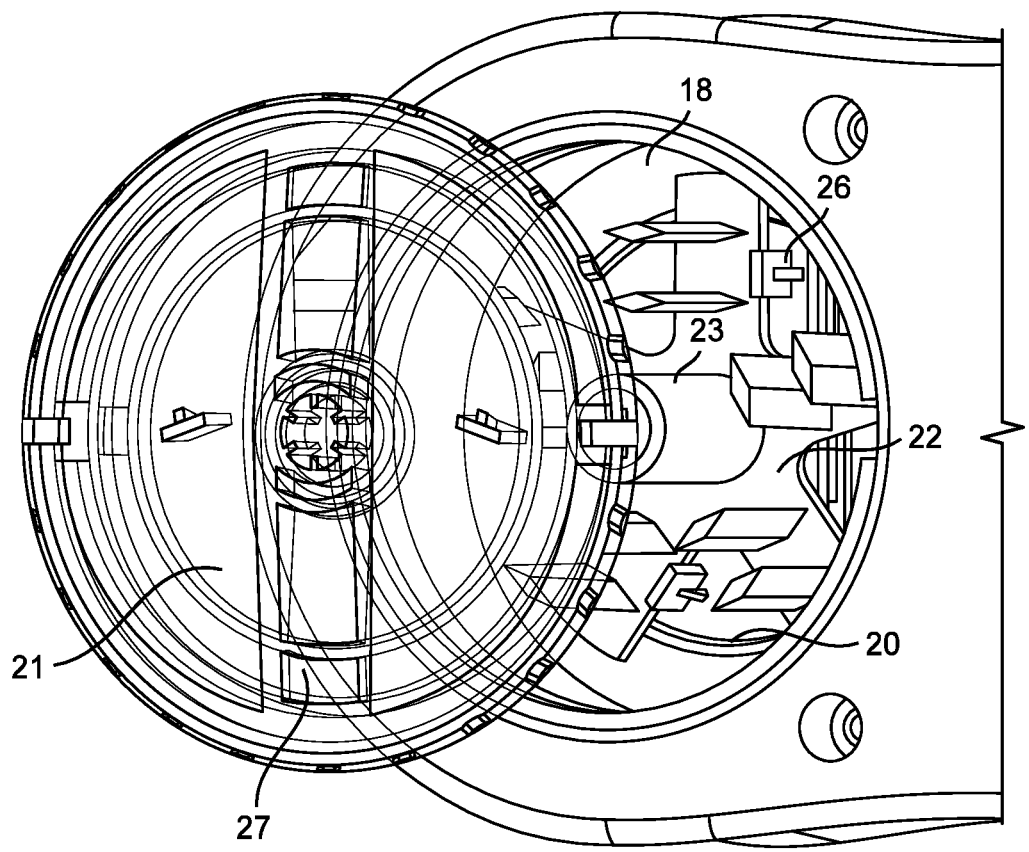
FIGS. 2A-2C illustrate the grinder compartment according to an embodiment.
Figure 2B:
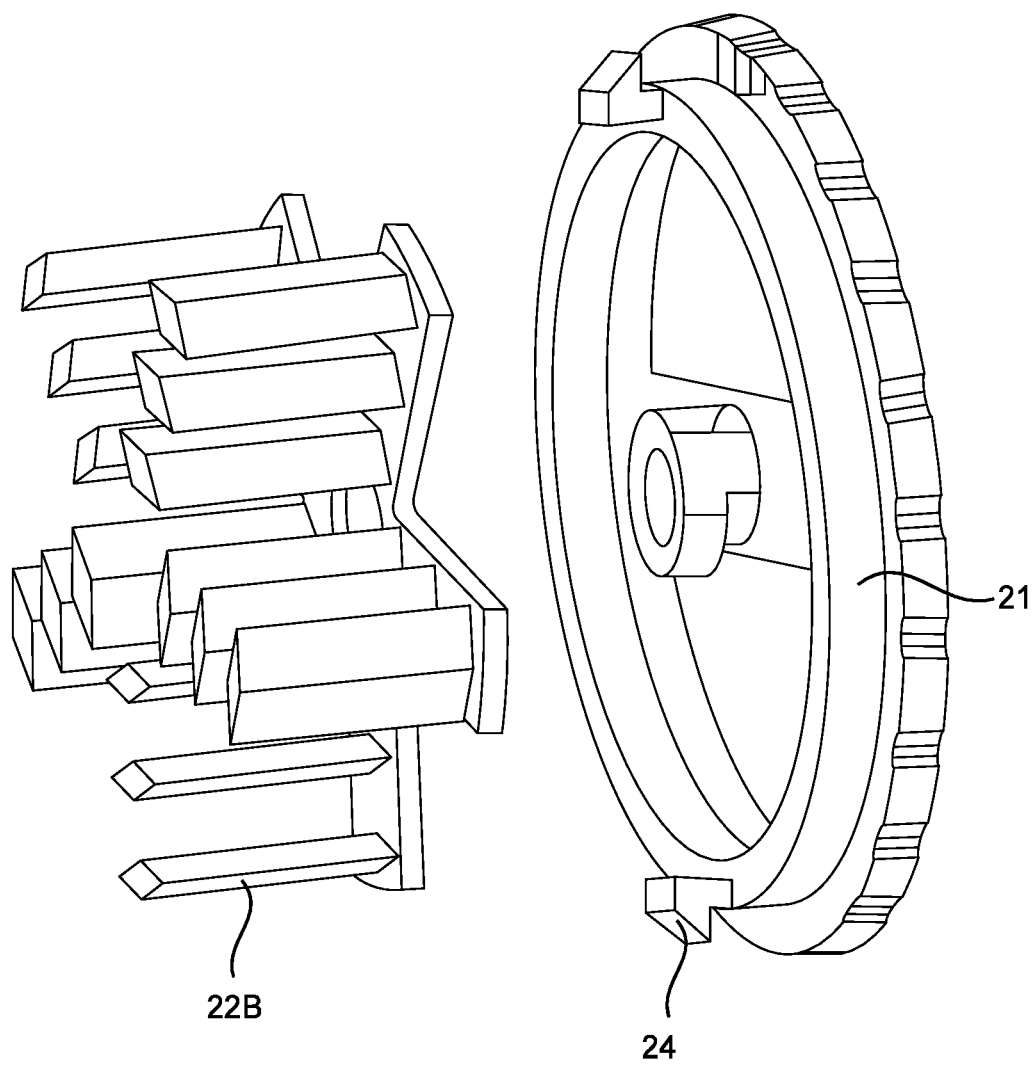
Figure 2C:
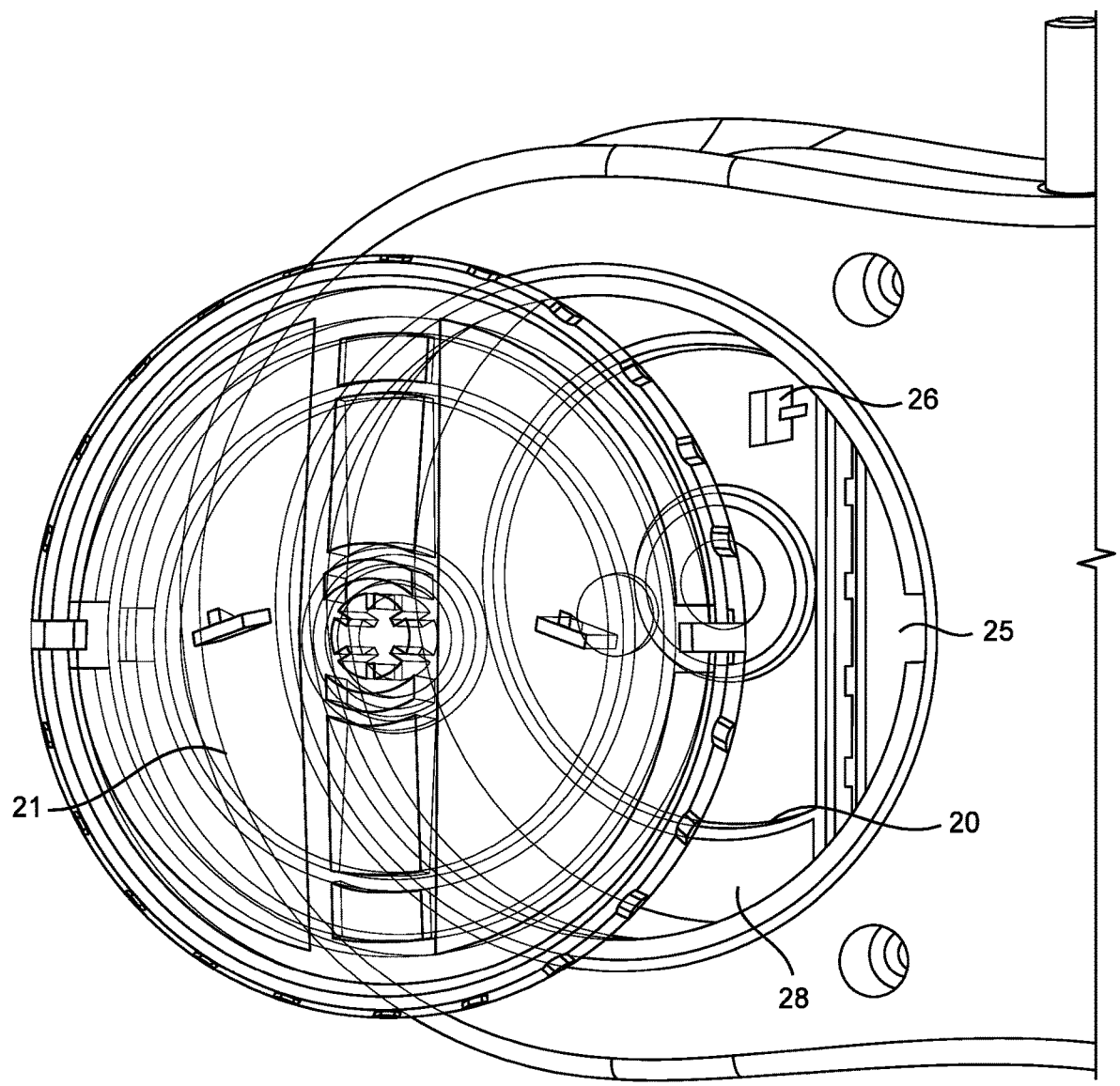

An embodiment of the grinder compartment 20 is further illustrated in FIGS. 2A-2C. The grinder compartment 20 includes a detachable cover/lid 21. In one embodiment, the grinder lid 21 is made of a clear or transparent material. The grinder lid 21 covers an opening 18 of the grinder compartment. The grinder lid 21 is shaped and dimensioned to substantially cover the opening 18. In one embodiment, as shown in FIG. 2B, the grinder lid 21 is substantially disk-shaped. An inside surface of the grinder lid 21 includes a female member/receptacle 23. The receptacle 23 is configured to be securely inserted within a complemental male member/projection (not shown) in the base 25 of the grinder compartment.

A first grinder is positioned along the base of the grinder compartment 20. A second grinder 22 is slid over projecting member 23 extending from the base of the grinder compartment. The projecting member 23 can be slid in a slot formed on the grinder lid 21. The first and second grinders can be held in position by clasps 26. The first grinder is stationary while the second grinder 23 can be configured to be turned by the grinder lid 21. The grinders can include multiple radially extending spokes wherein each spoke includes a plurality of teeth-like protrusions 22B.

An inside surface of the grinder lid 21 can include a pair of ridges that can fit within complemental grooves 25 on the opening 18. The grinder lid 21 can be radially rotated around opening 18 by turning a grip/handle 27 formed along its external surface. In use, salt, for example, clumped table salt can be inserted into the grinder compartment 20. The grinder lid 21 is then dropped into the opening 18 of the grinder compartment 20 to seal it. The user can then grip the handle 27 and spin it to grind the salt. The grinder teeth 22B can be manufactured using an alloy or another suitable material such that they are not easily damaged or worn out from use.

In one embodiment, a strong magnet can be centrally placed on the tip of the projecting member 23. The magnet can be a rare earth magnet. In an exemplary embodiment, the magnet is a neodymium diametric cylindrical or disc shaped magnet that is triple coated with nickel-copper-nickel for maximum durability and to protect against abuse and corrosion. A metallic piece can be affixed to the grinder lid such that the magnet at the base of the grinder compartment causes a tight magnetic closure of the lid.

The grinder compartment 20 also serves a secondary purpose. As shown in FIG. 2C, in one embodiment, the grinders can be detached from the clasps 26 and the grinders can be removed from the grinder compartment 20. This leaves a void/cavity 28 inside the grinder compartment 20. The cavity 28 can be closed with the transparent grinder lid 21. In this configuration, the grinder compartment 20 can function as a storage container for storing salt or any other projectile.

Figure 3:
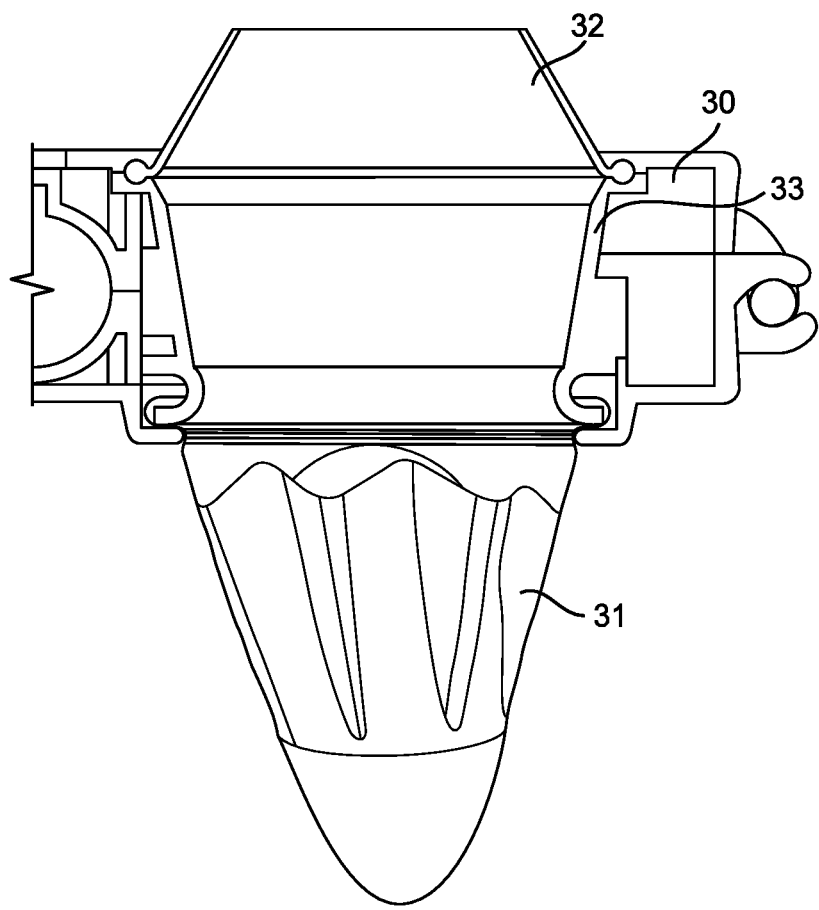
FIG. 3 illustrates a projectile conduit according to an embodiment.

As shown in FIG. 3, the shooting compartment 30 can also optionally include a projectile conduit 32. The projectile conduit 32 is inserted within an opening in planar surface 10A (as shown in FIG. 1A) of the body. The projectile conduit 32 has a substantially funnel shape with openings at its front and base. The projectile conduit 32 can be made of a supple/flexible material, such as, silicon. A first end of the projectile conduit 32 is inserted within an opening at the front of the body. The second end of the projectile conduit 32 is connected to the mouth of the pouch 31. The projectile conduit 32 can facilitate the collection and transfer of salt/projectile received from the grinding compartment 20 into the pouch 31. When the device is not in use, the projectile conduit 32 can be compressed inside the opening 33 of the shooting compartment 30.

Figure 4A:
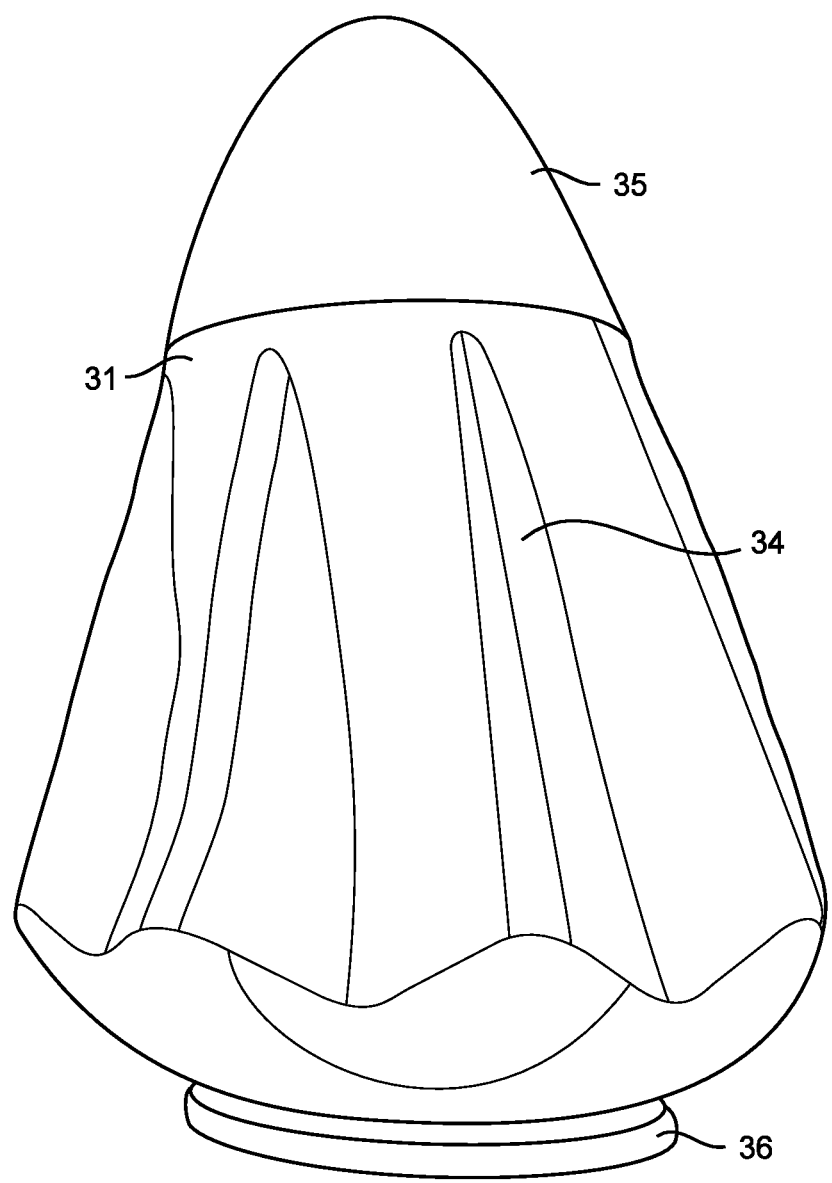
FIGS. 4A-4B illustrate a projectile pouch according to an embodiment.
Figure 4B:
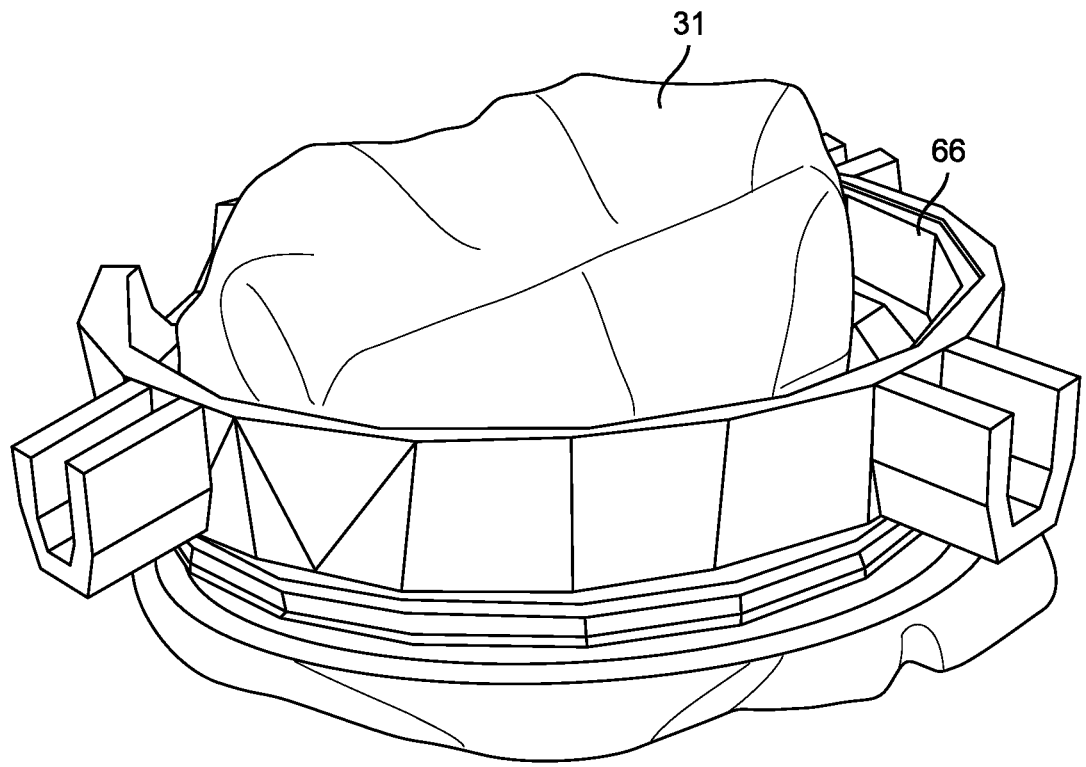

The pouch 31 is configured to shoot the projectile. The projectile conduit 32 has a narrow diameter funnel mouth. This can direct the projectile and can improve shooting accuracy. The pouch 31 can be made of rubber/elastic. As shown in FIG. 4, the pouch 31 can be reinforced with a plurality of ribbed elements 34 to enhance its strength. Since maximum stress is applied to the tip 35 of the pouch, it can be reinforced, for example, with a thicker material, to protect the pouch from tears as it is stretched out to shoot the projectile. The mouth of the pouch includes a lip 36. A second end/tip of the pouch 31 can be configured to hang out from the rear of the shooting compartment 30. In an embodiment, the front and rear openings to the shooting compartment can be covered with a cover or lid. As shown in FIG. 4B, the lip of pouch 31 can be placed on a female connector formed on a bottom surface of the shooting compartment. The pouch 31 can then be compressed within the shooting compartment using a complemental male connector (not shown). This prevents the pouch 31 from falling through the opening on the rear the shooting compartment 30. The size of the pouch can be increased or decreased depending on the desired amount of salt (more/less salt) and the distance (short/farther distances) that the salt is shot. In certain embodiments, the tip 35 of the pouch can include a colored end/tip. This facilitates proper holding of the pouch. The pouch 31 can also include printed line/lines which glow in the dark for aiming. This aiming line can continue from the pouch to over the device body.

Figure 5A:
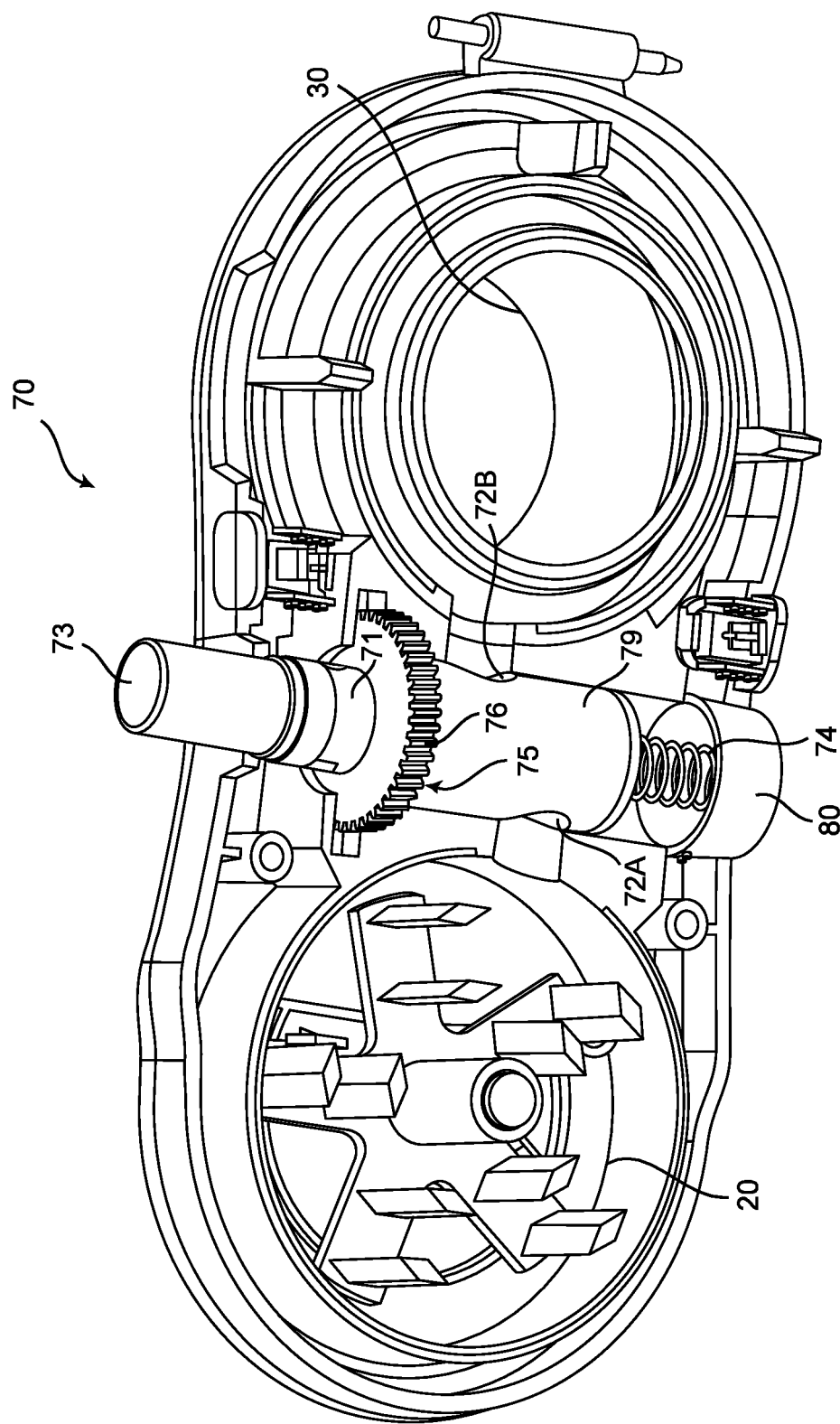
FIG. 5A illustrates a projectile dispensation regulator according to an embodiment.
Figure 5B:
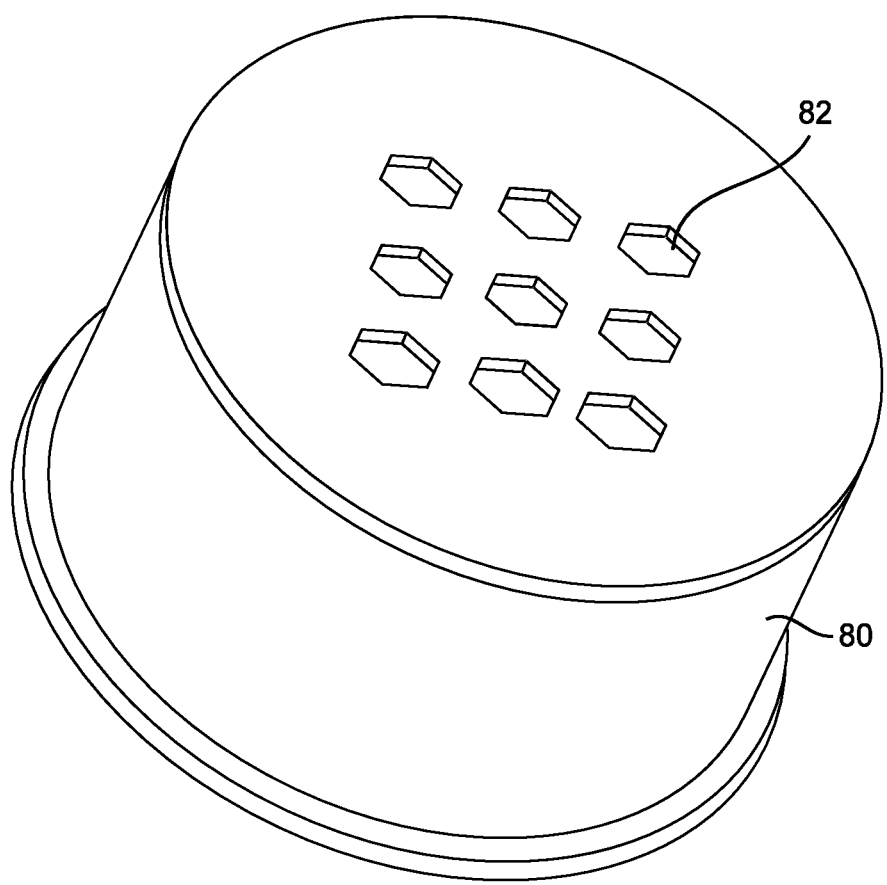
FIG. 5B illustrates a salt drain according to an embodiment.
Figure 6A:
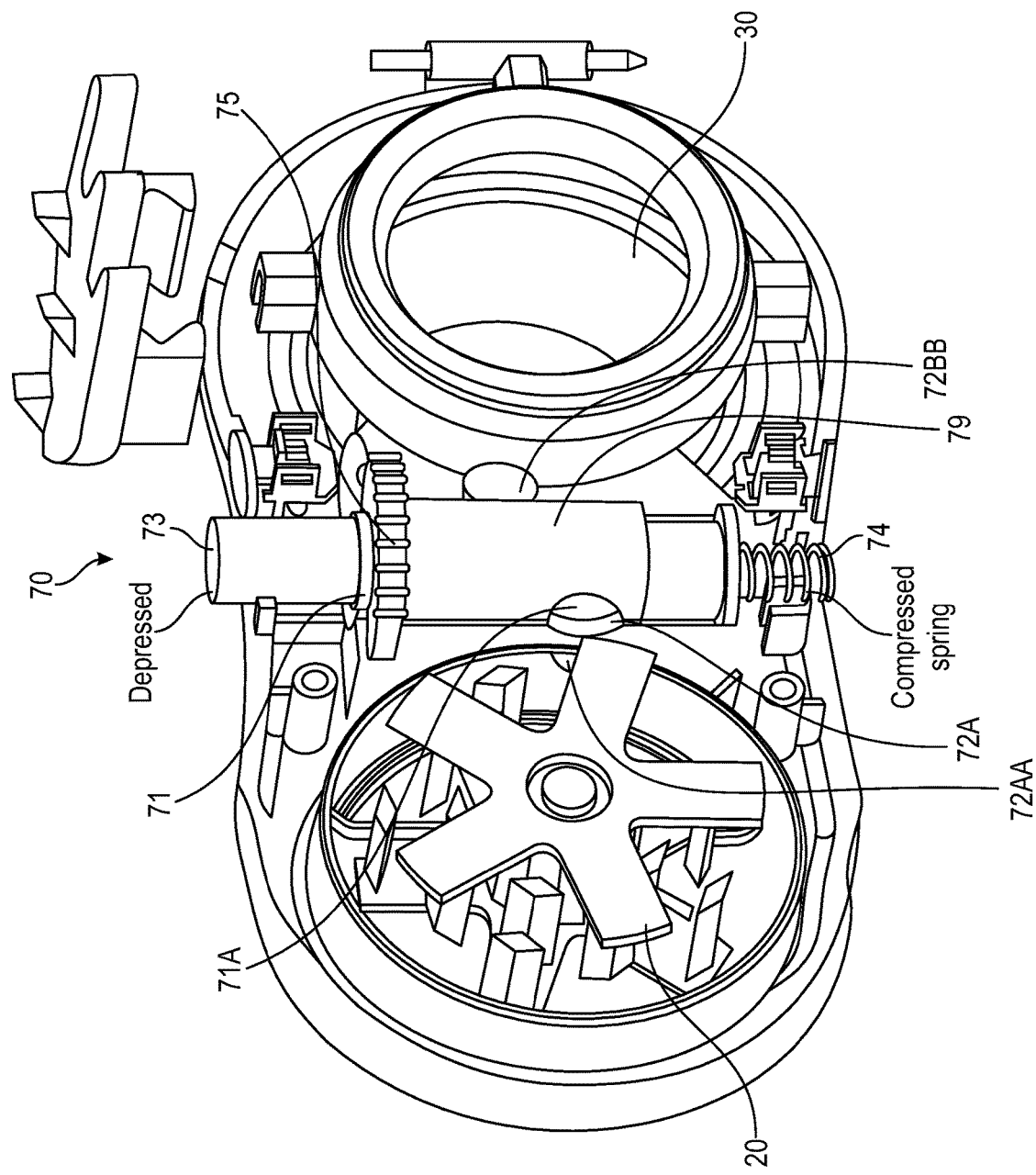
FIGS. 6A-6B illustrate cross sectional views of the projectile dispensation regulator according to an embodiment.
Figure 6B:
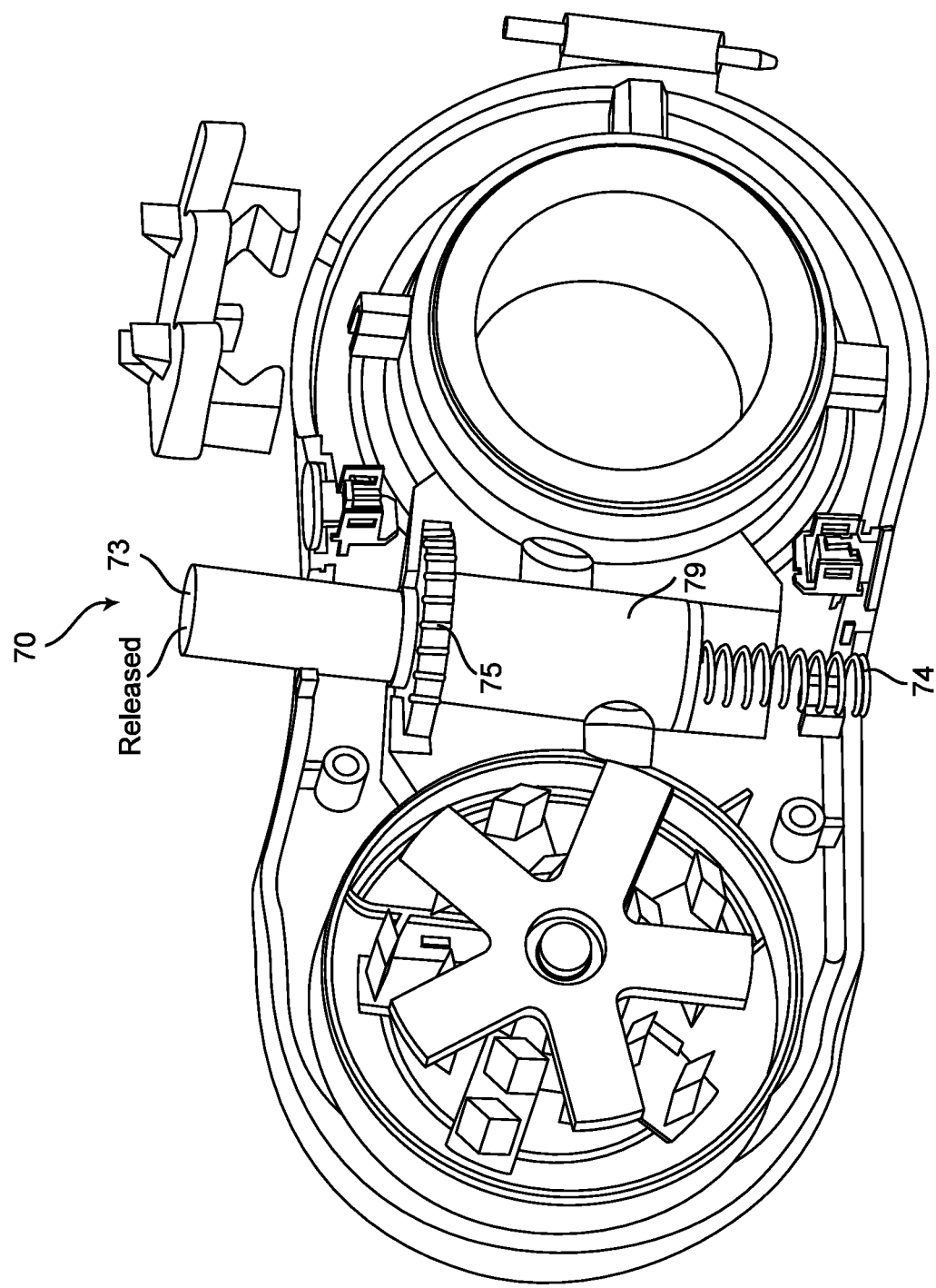
Figure 6C:
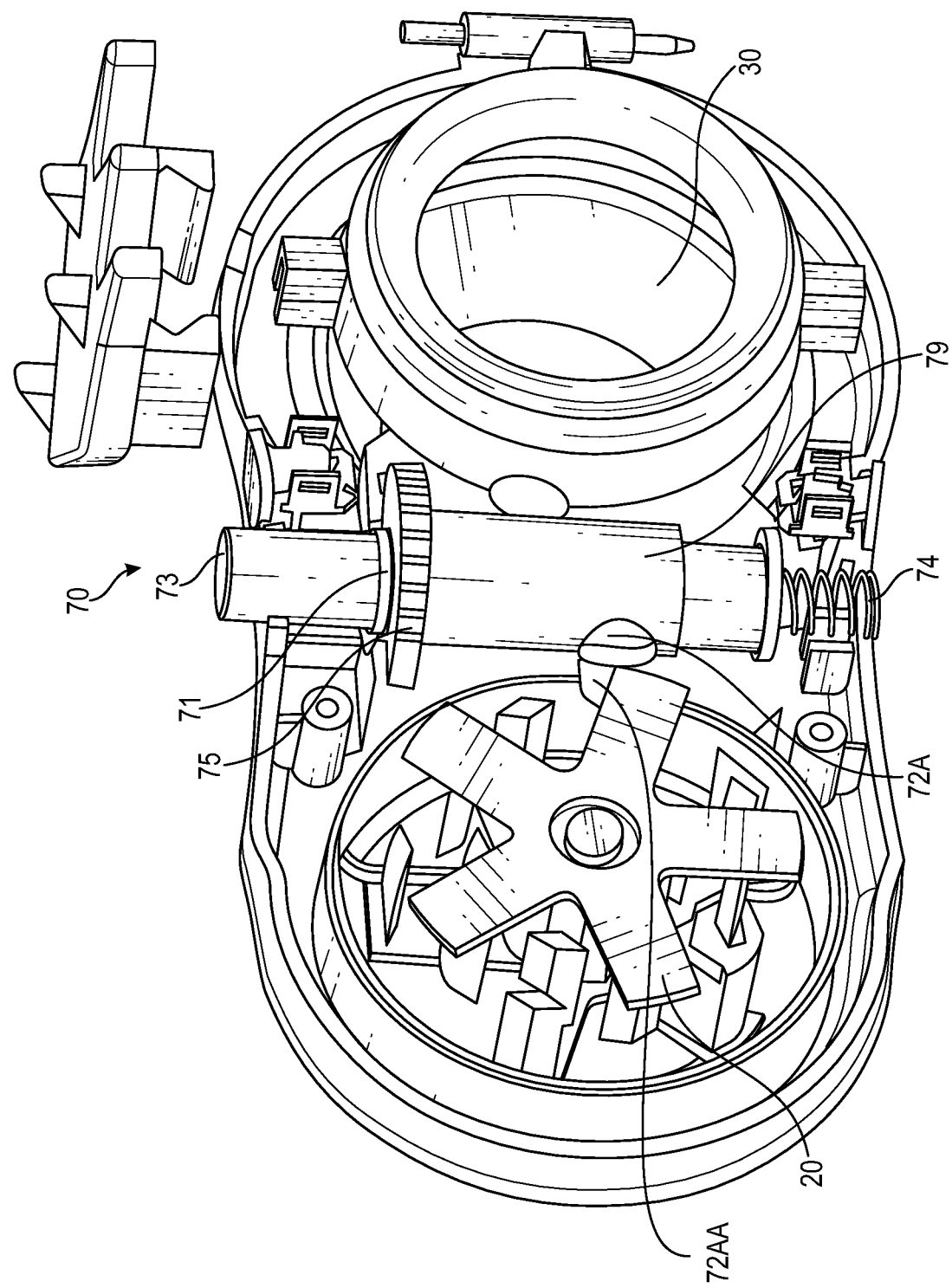
Figure 6D:
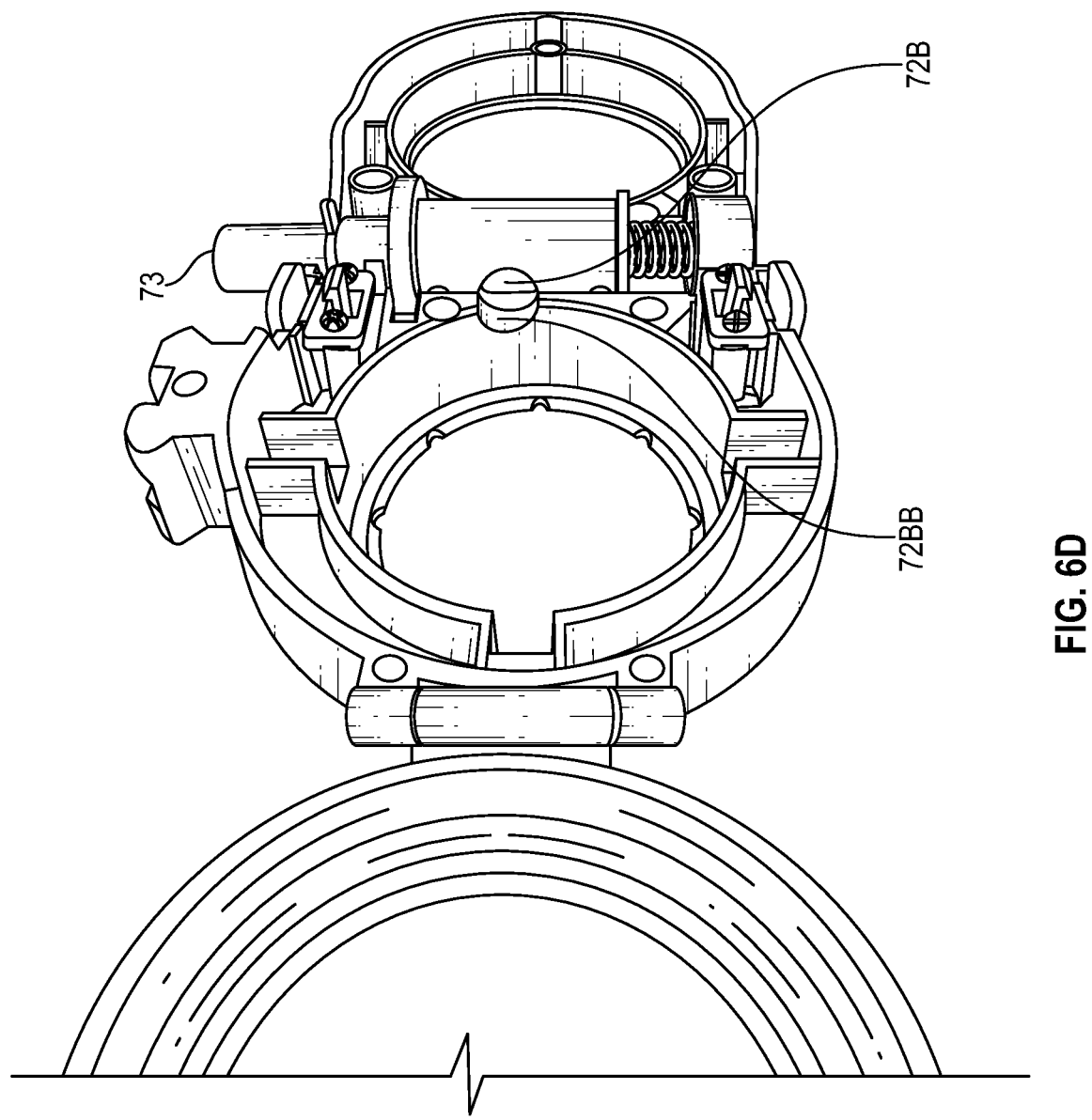

Now referring to FIGS. 5A-5B and 6A-D, the device 100 further includes a salt/projectile dispensation regulator 70. The regulator 70 is configured to be fitted within a vertical groove formed on an inside surface of the rear unit. The regulator 70 can include an outer elongate sleeve 79. FIG. 6C illustrates a perspective view of the device. The sleeve 79 can include a first opening 72A that is axially aligned along an opening 72AA on the grinder compartment 20. FIG. 6D illustrates a rear view of a cross-section of the device and a second opening 72B that is axially aligned along an opening 72BB on the shooting compartment 30. The openings 72A, 72B are configured to have a desired diameter in dependence on the desired projectile and the volume of the projectile to be dispensed from the grinder compartment 20 to the shooting compartment 30. In one instance, the diameter of the openings 72A, 72B can be around 10 mm-14 mm.

A thumbwheel 75 can be coupled to the sleeve 79. The thumbwheel 75 can be placed within a slit formed on the rear unit of the device body. A stopper, such as, a projecting member, can be positioned on either side of the thumbwheel 75. The thumbwheel 75 can be turned by moving its exposed edge. The thumbwheel 75 can include spaced apart ridges 76 along its surface. As shown in FIG. 1B, one of the ridges 76 can be designated to be wider than the other ridges and/or it can be provided with a different color (for example, a red color). The device 100 can also include a position marker.

The position marker can include any desired wording or symbols. For example, it can include an inverted arrowhead and/or wording, such as, "MAX".

The regulator 70 further comprises a dispenser 71. The dispenser 71 can include a hollow cylindrical shaft positioned within the sleeve 79. The hollow cylindrical shaft 71 includes an opening 71A extending therethrough across a diameter of the hollow cylindrical shaft 71. The dispenser 71 further includes a spring-actuated pushable button 73 and a recoilable spring 74 connected to the button 73. When button 73 is depressed, it causes the hollow cylindrical shaft 71 to move axially downward with respect to the sleeve 79 so that the opening 71A can be aligned with the opening 72A of the sleeve 79. When the button 73 is released, it allows the hollow cylindrical shaft 71 to move axially upward with respect to sleeve 79 so that opening 71A can be aligned with the opening 72B of the sleeve 79.

A second end of the spring 74 is connected to a removable salt tray/drain 80. As shown in FIG. 5B, the salt drain 80 can be shaped like a bottle cap or the cap of a salt shaker. A base of the salt drain 80 includes a plurality of openings 82. The openings 82 can ensure that any salt that does not get dispensed into the shooting chamber 30 is discarded from the device. The salt drain 80 can be cleaned periodically to ensure that the openings are not clogged. The entire device 100 is configured to be dishwasher-safe and can be washed, as needed.

The dispensation of the projectile from the grinder compartment 20 to the shooting compartment 30 is illustrated with reference to FIGS. 6A-D. Initially, the opening 72AA to the grinder compartment 20 is in a closed position while the opening 72BB to the shooting compartment 30 is in an open position. The thumbwheel 75 can be turned which causes the sleeve 79 to be rotated about its axis to the right or left. This rotation of the sleeve 79 aligns the opening 72A of the sleeve 79 with the opening 72AA on the grinder compartment 20 and aligns the opening 72B of the sleeve 79 with the opening 72BB of the shooting compartment 30. The user can press down on the button 73 of the hollow cylindrical shaft 71 causing the spring 74 to be depressed and causing opening 71A of the hollow cylindrical shaft 71 to be aligned with the opening 72A of the sleeve 79 and thereby facilitates dispensing of the salt from the grinder compartment 20 through the opening 72A of the sleeve 79 and then into the opening 71A of the hollow cylindrical shaft 71. The button 73 of the hollow cylindrical shaft 71 is then released to close the opening 72A and move the ground salt held within the opening 71A of the hollow cylindrical shaft 71 upward towards opening 72B so as to be aligned with the opening 72B of the sleeve 79, wherein the ground salt is then transferred through the opening 72B of the sleeve 79, through opening 72BB and then into the shooting compartment 30. The thumbwheel 75 can be turned to the right or left to close the openings 72A-B on the sleeve 79. This ensures that there is no further movement of the salt from the grinder compartment 20 to the shooting compartment 30.

As described earlier, the grinders can be removed from the grinder compartment and the salt/projectile may be merely stored within the grinder compartment. In this embodiment, the pushing of the button will transfer the stored projectile (as opposed to the ground projectile) from the grinder compartment to the shooting compartment.

Ideally, the projectile has a diameter that is about or less than 10-14 mm. Preferably, the projectile has a diameter that is less than 10 mm so that it can be easily transferred by the regulator from the grinding compartment over into the elastic pouch.

The device 100 utilizes stored elastic energy to shoot the projectile at a bug at a high speed in order to kill it. This maximizes the elastic energy stored in the pouch which can translate into a maximum kinetic energy of the projectile upon release and can result in the maximum release speed of the projectile.

In one embodiment, an upper surface of the body 10 can be provided with a smooth groove for the user's index finger to smoothly access the push on button.

According to an embodiment, after the salt is dispensed into the shooting compartment, it falls into the attached pouch. A user can hold the device in one hand (for example, the left hand) and pull the pouch back/out with the other hand (for example, the right hand) to shoot the salt/projectile out. Conveniently, the device can be used with any projectile that can fit within the openings between the grinder compartment and shooting compartment such that the projectile can be moved from the grinder compartment to the shooting compartment. In certain embodiments, larger projectiles can be placed directly within the pouch in the shooting compartment. After use, the projectile conduit can be pushed back into the shooting compartment. This facilitates portability of the device in a user's pocket.

The device 100 further includes a pair of disk-shaped covers. An exemplary cover 37 is shown in FIG. 1B. The covers are configured to close the front and rear openings of the shooting compartment. This allows the pouch to be secured and protected inside the device when it is not in use. The disks can also be configured to be attached on hinges to open and close the first compartment. In an embodiment, depressing and releasing the push button of the regulator releases the front and rear disks to expose the pouch stored inside the shooting compartment. The pouch can be pulled out through the rear of the device to shoot the projectile.

In one embodiment, a kit including the device 100 and one or more winged insect toys (not shown) is provided. The toys may be made of PVC plastic or another suitable durable material. The toys may be contained within a jar or another suitable enclosure. The size and appearance of the toys can substantially mimic or approximate that of a corresponding winged insect. The toys can be used for learning to operate the device, target practice, a game or a combination thereof. The kit can further include replacement pouches and instructions for using the device.

According to an embodiment, a method of using the device involves opening the grinder lid and pouring a desired amount of salt inside the grinder compartment. The grinder lid can be closed with the magnetic closure at the base of the grinder compartment. The grinder lid is spun to grind the salt to a desired size. This is followed by depressing the push button of the regulator to allow salt to enter an opening in the vertical regulator shaft. The button is then released to force the salt to enter the shooting compartment from another opening in the vertical regulator shaft. The salt can drop into the pouch via the conduit. The user should be able to feel the salt inside the tip. The user can then grip the tip of the pouch and aim the salt at the bug to be exterminated. The user can release the grip on the pouch which propels the salt forward.

The device is configured to be comfortably in one hand. Lasers, lights, etc. can be provided on the device to aid with the aiming. The printed aim lines on the pouch are aligned with the aim lines on the device for accuracy. The device uses salt to kill winged insects, such as, flies and mosquitoes using elastic sling power. This creates a novel experience for the user for bug eradication. The device does not involve many moving components to propel salt. It does not require compressed air like other conventional technologies.

Conveniently, the device does not involve chemicals, unsightly fly tape or attractants and batteries or electricity. The device does not become messy or dirty like a flyswatter. It has a portable design and can fit within a pocket. It is quiet in use.

In certain embodiments, the device can be a waterproof device. The device can have an integrated ultrasonic waterproof speaker for mosquito repellant frequencies. The device may be configured to produce or hold an insect repelling odor or substance. The device can be configured to glow in the dark. The device can be configured to have a small camera with a SD card to that videos can be made of the user shooting bugs for uploading online or to the social media. The device can have a holding accessory—such as a holster, so that the device can be attached to a belt for quick access and portability.

The device may be also used in other applications. For example, it may be used in massage therapy, for seed bombs and shooting plant seeds.

The device can be used in restaurants, as outdoor entertainment in fishing, hunting and camping.

It is understood that, although the terms first, second, front, back, rear etc. are used herein to describe various surfaces, compartments, etc., these surfaces and compartments should not be limited by these terms. These terms are only used to distinguish one surface or compartment from another surface or compartment. Thus, a first compartment discussed above could be termed a second compartment without departing from the teachings of the present invention.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only.

The invention claimed is:

1. An insect eradication device, comprising:
    a first compartment, wherein the first compartment is configured to receive a projectile, wherein the projectile comprises salt, wherein the first compartment includes a detachable grinder, and wherein the grinder grinds the salt before it is transferred to a second compartment;
    the second compartment, wherein the second compartment is radially opposite the first compartment, wherein the second compartment is configured to receive the ground salt from the first compartment and forcibly expel the ground salt to a target, wherein the second compartment comprises a pouch; and
    a projectile dispensation regulator positioned between the first and the second compartments, wherein the regulator is configured to transfer the ground salt from the first compartment to the second compartment, wherein the regulator further comprises:
    a movable sleeve;
    an inner hollow shaft having an opening therethrough and being positioned within the movable sleeve;
    a spring-actuated pushable button coupled to the inner hollow shaft to cause the inner hollow shaft to move axially with respect to the movable sleeve, wherein the sleeve comprises:

a first opening adjacent the first compartment, the first opening configured to facilitate a transfer of the ground salt from the first compartment into the sleeve, and a second opening adjacent the second compartment, the second opening configured to receive the ground salt from the sleeve into the second compartment; and wherein the opening of the inner hollow shaft can be aligned with the first opening when the spring-actuated pushable button is depressed; and wherein the opening of the inner hollow shaft can be aligned with the second opening when the spring-actuated pushable button is released.

2. The device according to claim 1, further comprising:

a rear unit, wherein the rear unit is a single planar body; and a thumbwheel, wherein the thumbwheel is positioned within a slit formed in the rear unit and is adjacent the pushable button.

3. The device according to claim 2, wherein the first and second openings are configured to be opened or closed by a rotation of the thumbwheel.

4. The device according to claim 1, wherein the pushable button is configured to be depressed to facilitate a transfer of the ground salt through the first opening into the opening of the inner hollow shaft.

5. The device according to claim 4, wherein releasing the pushable button facilitates a transfer of the ground salt from the opening in the inner hollow shaft into the second compartment through the second opening.

6. The device according to claim 1, wherein the device is a plastic device.

7. The device according to claim 1, further comprising at least one rail or bracket provided on an outer surface of the second compartment.

8. The device according to claim 7, wherein the at least one rail or bracket is configured to receive at least one apparatus selected from a group consisting of a laser, a flash light, a pointer, an aiming apparatus, a camera, a phone and a LED light.

9. The device according to claim 1, wherein the pouch is reinforced with a plurality of vertical ribbed elements.

10. The device according to claim 1, wherein the first compartment and the second compartment are circular in shape.

* * * * *